3,003,991
COMPOSITION COMPRISING AN UNSATURATED POLYESTER, A SUBSTANCE CONTAINING AT LEAST ONE $CH_2=C<$ GROUP, A VANADIUM COMPOUND AND BENZENE PHOSPHINIC ACID, AND METHOD OF CURING SAME

Carl A. Marszewski and John O. Koontz, Toledo, Ohio, assignors to Allied Chemical Corporation, a corporation of New York
No Drawing. Filed Nov. 13, 1957, Ser. No. 696,037
9 Claims. (Cl. 260—40)

This invention relates generally to methods of effecting cure of polyester resins and to the production of polymerizable polyester compositions suitable for rapid curing. More particularly, the invention relates to methods of effecting gelation and final cure of certain peroxy-catalyzed unsaturated polyester resin compositions by the use of specific substances that cause the acceleration of the catalysts, and to the production of unsaturated polymerizable polyester compositions containing such catalyst accelerators and suitable for rapid gelation and final curing by the incorporation therewith of a peroxy catalyst of a specific class.

The term "unsaturated polyester resin composition" is used herein in the general sense it now conveys in the art; namely, to refer generally to those compositions that comprise a polymerizable unsaturated polycarboxylic acid-polyhydric alcohol polyester, which is prepared by an esterification reaction between one or more polybasic acids, at least one of which is unsaturated, and one or more polyhydric alcohols. Such compositions preferably comprise also a copolymerizable monomeric substance that contains at least one $CH_2=C<$ group.

In general, unsaturated polyester resin compositions of the type referred to cure or harden very slowly. This characteristic originally limited utility of such resins insofar as commercial use was concerned. However, it has been conventional in the art for some time to add a catalyst, usually some type of peroxy compound, prior to use of the polyester composition, whereby the rate of cure is greatly increased. As a result, polyester resin compositions have found wide applicability in the molding, laminating, casting, coating, and other fields.

It is considered a proven fact in the art that peroxy compounds, when used as catalysts for unsaturated polyester resin compositions, initiate the formation of free radicals which, in turn, hasten hardening or cure by increasing the rate of final polymerization of such compositions through their olefinic unsaturated double bonds. Most frequently, heat is also required to set off the decomposition of the peroxy compound to thus form the first free radical which then, in turn, forms additional free radicals from the polyester molecule, whereby polymerization thereof proceeds at a comparatively rapid rate. Some peroxy catalysts are more active than others and may not require the addition of heat to initiate decomposition thereof.

However, in many cases, means other than heat, or in addition thereto, are used for inducing decomposition of the peroxy compounds and thereby accelerate the catalytic action thereof. Such other means comprise the use of certain compounds that induce such decomposition of peroxy compounds and which have come to be known as "promoters" or "accelerators" therefor.

The art has progressed to the extent that workers therein have set up general classes of substances to cover groups thereof that have been found to function with greatly varying effects as promoters for peroxy-catalyzed unsaturated polyester compositions, although the particular use of a given substance (or group of substances) that happens to fall within these general classes may not be predicted with any degree of certainty, nor are the classes considered complete. Thus, as their unique functions have been discovered, substances have come to be grouped into these six general classes: (1) metal systems; e.g., cobalt napthenate, iron naphthenate, ferrous phenanthroline complexes, etc.; (2) Lewis acids; e.g., boron fluoride dihydrate, ferric chloride, perchloric acid, etc.; (3) bases; e.g., tetraethanol ammonium hydroxide, tetramethylammonium hydroxide, etc.; (4) amines; e.g., dimethylaniline, 2-aminopyridine, diethylaniline, etc.; (5) quaternary salts, e.g., trimethyl benzyl ammonium chloride, tris-(p-chlorophenyl)-benzyl phosphonium chloride, tetrakismethylol phosphonium chloride, etc.; and (6) mercaptan; e.g., n-dodecylmercaptan, tertdodecylmercaptan, n-heptylmercaptan, 2-mercaptoethanol, etc. Certain other substances, of a more or less miscellaneous nature, do not fall within any of the above categories, but have been found to have some promotive effect on certain peroxy catalysts; e.g., sodium sulfoxylate formaldehyde, chlorotriphenylmethane, ascorbic acid, isoascorbic acid, etc.

As indicated previously, some of the known "peroxy-promoted" combinations require some heat anyway, while others do not. These latter combinations are particularly advantageous for certain applications inasmuch as room temperature hardening or cure of polyester compositions can be achieved.

There are several criteria for determining the comparative worth or relative effectiveness of peroxy-catalyst promoter systems. For example, the criteria relied upon in the standard Society of the Plastic Industry (SPI) hardening tests are useful for such comparisons. The tests are commonly referred to in group as the SPI Gel Time Determination. Briefly, the tests involve determination of the time temperature characteristics of a particular resin sample solution containing a known amount of catalyst and a known amount of a particular promoter. More particularly, one of these criteria determined in the aforesaid test is "gel time" which is the time interval measured that it takes for the resin sample solution to pass from 150° F. to 190° F. wherein greater promotive power is reflected in shorter "gel time." Another is "time of exotherm," which is the time interval measured from the time the sample attains a temperature of 150° F. until the highest of peak temperature is attained, the shortness of such time similarly indicating the degree of promotive power. Still another criterion is "peak exotherm," which is the actual highest temperature reached by the resin sample solution during cure. This last value, in addition to indicating the promotive power of a substance used for such purpose, indicates the likelihood that the resin will cure to an acceptable rigid state under room temperature conditions and within a reasonable time, the comparison, however, being taken under elevated temperature curing conditions.

In addition to the foregoing, the room temperature pot life of polyester resin solutions containing predetermined amounts of catalyst and promoter is also of importance in determining the efficacy of a catalyst-promoter system. Pot life is measured as the time that it takes, subsequent to incorporation of the promoter-catalyst system, for gelation to occur at room temperature, and gelation is said to occur when the resin solution is no longer flowable. As a practical matter, it is necessary that a polyester resin have a sufficiently long pot life so that, after it is catalyzed and promoted by the additions of a peroxy compound and accelerator, respectively, there still remains sufficient time to pour, spread or otherwise arrange the resin into the shape or form desired in the hardened, rigid state, before it becomes non-flowable. On the other hand, it is frequently highly desirable, particularly in room temperature curing applications, for the polyester resin to have a rather short pot life (e.g., 15 minutes) whereby gelation will occur very quickly after the aforesaid spreading or otherwise arranging operation, so as to eliminate flow-off, disarrangement, etc., which otherwise occurs and which usually requires time-consuming, continued spreading, reforming and rearranging until gelation does finally set in.

While certain of the presently-known catalyst-promoter systems for polyester resins do achieve optimum results in one or more of the four criteria described above, they leave much to be desired in the matter of achieving desirable balances of values in all four criteria.

In certain special applications of polyester resin compositions, specifically, those that comprise pigments, it has been found that the latter, particularly those containing cadmium, often function as strong inhibitors for the known catalyst-promoter systems. The problem is complicated by the fact that, upon increase of the amount of known promoters in polyester resins containing pigments that have the inherent inhibitive function referred to (in an attempt to overcome such inhibitive action), the promoters per se tend to discolor the compositions, whereby a dilemma is posed.

Another known difficulty with the polyester compositions that contain a promoter and peroxy-catalyst system, is that while they may achieve varying degrees of fair or good results in the criteria discussed above, they may have the tendency to cause uncontrolled or runaway reactions due to the over-promotion of the peroxy catalyst. As a consequence, hot spots in localized areas of the curing mass may occur with resultant serious flaws in the finished products that are obtained therefrom.

In view of the foregoing, it is a primary object of the present invention to provide methods of effecting cure of unsaturated polyester resins at rapid rates.

It is another object of the present invention to provide such methods referred to above that result in optimum balances of the criteria for promoter effect; namely, gel time, time of exotherm, peak exotherm, and pot life.

It is yet another object of the invention to provide novel compositions that cure rapidly upon the addition of a substance chosen from a specified class of peroxy catalysts.

It is yet another object of the invention to provide methods for effecting rapid cure of polyester resins that contain inhibitive pigments, without adversely affecting the color of such compositions.

It is yet another object of the invention to provide polyester resin compositions that contain inhibitive pigments and promoters, and which cure rapidly upon the addition of a peroxy catalyst of a specified class, without any adverse effect on the color of such compositions.

Another object of the invention is to provide a method of curing unsaturated polyester resin compositions that assures aforesaid advantages and, in addition, results in smooth and controlled polymerization reactions.

It is yet another object of the invention to provide novel compositions that include two-component promoter systems that, subsequent to incorporation therein of a catalyst of a specified type, and in addition to the advantages in curing characteristics referred to above, assure smooth, even, and controlled polymerization and resultant minimization of flaws in the finally cured product.

Other objects, purposes and advantages of the invention will appear to those skilled in the art upon reading the description of the invention that follows.

In general, the invention resides in methods of effecting cure of unsaturated polyester resins derived from polyhydric alcohol and unsaturated polycarboxylic acid, which comprises incorporating therein as catalyst-promoter system, a tertiary hydroperoxide as hereinafter defined, a substance that contains a vanadium atom therein in an oxidation state of less than 5, and benzene phosphinic acid. The invention also comprises the production of polymerizable unsaturated polyester resin compositions that comprise (a) an esterification product of polyhydric alcohol and unsaturated polycarboxylic acid, (b) an organic solvent-soluble vanadium compound that contains a vanadium atom in an oxidation state of less than 5, and (c) benzene phosphinic acid, which compositions are particularly adaptable for quick curing by the addition of a peroxy catalyst chosen from certain tertiary hydroperoxides. Preferably, in accordance with the invention, both in exercising the method and in the production of the product, a compound containing at least one $CH_2=C<$ group and having a boiling point above 60° C. and copolymerizable with the unsaturated polyester resin, is included.

As polybasic component of the unsaturated polyester resin, there may be chosen an alpha-beta dibasic organic acid, of which are preferred, maleic, fumaric, glutaconic, itaconic, mesaconic, and citraconic. Maleic, itaconic or citraconic anhydrides may be used instead of the corresponding acids. Other isomers of the maleic series, typified by allyl-malonic, allyl-succinic, and xeronic acids may also be used in the production of the polyesters. Also employable are certain polybasic acids which decompose under heat to yield acids of the maleic type, such as malic and citric acids. Unsaturated dibasic organic acids admixed with other dibasic acids, such as phthalic, tetrachlorophthalic, hexachloroendomethylene tetrahydrophthalic (or their anhydrides), adipic, sebacic, etc. are similarly useful. The foregoing listing of acids with which polyesters may be prepared is to be understood as merely illustrative and not limitative, it merely being preferred that the polyester be an unsaturated polyester wherein at least 20 mol percent of the polycarboxylic acid is alpha-beta unsaturated polycarboxylic acid or anhydride.

Of the polyhydric alcohols which are known to be useful in the production of unsaturated polyester resins to which the present invention pertains, there may be chosen dihydric alcohols and mixtures thereof, or mixtures of dihydric alcohols and small amounts of higher polyhydric alcohols. The glycols, such as diethylene glycol, triethylene glycol, trimethylene glycol monoethylene and propylene glycol and derivatives thereof, may also be used. Examples of higher polyhydric alcohols which may be employed in the production of the polyester contemplated, in amounts not exceeding about 5 mol percent, are glycerol, pentaerythritol, mannitol, etc. Also employable as part or all of the dihydric alcohols to be used, are the more complex glycols of the bisphenol A type, such as those disclosed in U.S.P. 2,331,265.

The unsaturated polyester resins for which the present invention has been found to be most useful are those that are manufactured from polyhydric alcohol and unsaturated polybasic acid by standard and well known polyesterification techniques, to have acid numbers not greater than 50, although resins having acid numbers as high as 100 may be used and may even be desirable in some cases. Generally, the acid number should be as low as possible and particularly good results are obtained when the polyester resin used has an acid number between 15 and 50.

A polymerizable unsaturated monomeric substance that may be included with the unsaturated polyester resins in conventional manner and in the practice of the present invention, may be any substance (or mixture of such substances) whose molecule contains at least one polymerizable ethylenic double bond that is capable of copolymerizing with the polymerizable unsaturated polyhydric acid-polycarboxylic acid polyester. Examples of such monomeric substances are now well known in the polyester art, and include, merely by way of example, styrene, p-methyl styrene, vinyl toluene, divinyl benzene, methyl acrylate, methyl methacrylate, acrolein, diallyl phthalate, triallyl cyanurate, the diallyl ester of endomethylene tetrahydrophthalic anhydride, etc.

The tertiary hydroperoxide catalyst may be an aralkyl hydroperoxide having the following formula:

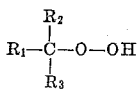

where $R_1$ is an aryl group, $R_2$ and $R_3$ are alkyl groups and any of $R_1$, $R_2$ or $R_3$ may contain substituents attached thereto, other than halogens or other atoms or groups which might adversely affect the character of the hydroperoxide linkage. Examples of such hydroperoxides are cumene hydroperoxide, cymene hydroperoxide, sec-butylbenzene hydroperoxide, 1-methyltetralin hydroperoxide, etc. Generally, the tertiary hydroperoxide may be incorporated in amounts ranging from about 0.5% to about 3.0% by weight of the total polyester resin composition (including monomer if incorporated) to be cured depending upon the hydroperoxide used, the total amount of peroxy catalyst to be used (as will appear from the description hereinafter), the amount and kind of vanadium compound chosen as promoter, and the extent of catalytic action desired for the polyester resin composition chosen.

The promoter to be used in conjunction with the tertiary hydroperoxide to form the system in accordance with the present invention may comprise any vanadium-containing organic substance wherein the vanadium atom is in an oxidation state of less than 5. Preferably, the vanadium-containing organic substance should be soluble in the polyester resin composition with which it is incorporated. Examples of vanadium-containing substances useful in exercising the invention are vanadium naphthenate, vanadyl hexamethylene tetramine, vanadyl 8-hydroxyquinolinate, vanadyl diethyldithiocarbamate, vanadium tetramandelate, vanadyl disalicylal ethylenediimine, vanadyl disalicylal ethylenediimine monopyridinate, etc. The vanadium-containing substance may be incorporated in amounts ranging from about 0.003% to about 0.5% by weight of the total polyester resin composition depending, as in the case of tertiary hydroperoxide chosen, upon the substance utilized, the kind and amount of catalyst to be incorporated, and the extent of promoter action desired.

In many instances, it may be desirable to include with the hydroperoxide catalyst of the type described above, a second peroxy catalyst such as benzoyl peroxide. Preferably, to obtain the benefits of the invention, which include a lower cost for the catalyst system, in addition to the optimum balance of gelling and curing characteristics as defined by the test-criteria referred to hereinbefore; the amount of benzoyl peroxide, when included, is kept within 40% of total peroxy catalyst employed.

For the purpose of assuring a smoothly controlled promotive action of the vanadium compound upon the catalyst system comprising a tertiary hydroperoxide it has been found advantageous in accordance with the invention to add a second composition that may have some promotive action per se. Thus, it has been discovered that the inclusion of benzene phosphinic acid as such second promoter has unexpectedly good results due to a synergistic action whereby the promotive function is enhanced, but in an effectively controlled manner, that avoids runaway reactions and localized hot spots in the curing mass. It has been found that this second promoter may be included in amounts from about 0.03% to about 0.5% by weight of the total polyester system employed. When appreciably less than the aforesaid minimum amount is included, no practical effect is observed, whereas when appreciably more than the maximum amount of second promoter is employed, control of the accelerator function of the promoter system upon the catalytic action of the tertiary hydroperoxide is no longer assured. The inclusion of benzene phosphinic acid as second promoter, in addition to causing controlled curing of the compositions whereby more uniform gel times are achieved with similar compositions, also aids in the retention of color in pigmented polyester compositions when cured. Moreover, the aforesaid synergistic function of benzene phosphinic acid, allows the use of even less of the more expensive benzoyl peroxide, for desired augmentation of the catalytic action of the tertiary hydroperoxide, than when such acid is not included.

In the exercising of the invention, the unsaturated polyester chosen to be used is preferably mixed with a monomer, as referred to above, and the organic vanadium composition, chosen to function as one component of the two-component promoter system and benzene phosphinic acid as the second promoter, are thoroughly mixed into the polyester-monomer mixture. Thereafter, and at a predetermined time before the ultimate use of the unsaturated polyester composition for curing, a hydroperoxide of the type described above is incorporated as catalyst. The predetermined time is dependent upon the proportions of ingredients employed chosen for a particular application since, as a feature of the invention, sufficient time is allowed by the use of the novel promoter-catalyst system described herein, to permit placement of the polyester composition where it is intended to be cured. Thereafter, the polyester resin begins to gel so that continued working thereof, to assure that it is in the desired shape and/or position at the time ultimate hardening occurs, is minimized or unnecessary.

An hydroperoxide of the type defined herein; e.g., cumene hydroperoxide, when used as the major component of a catalyst system for polyester resins, and promoted by a vanadium compound as specified herein, and benzene phosphinic acid, in accordance with the invention, is comparable to catalyst systems that employ the much more expensive benzoyl peroxide as sole component, whether promoted or not. To demonstrate this, the following experiments were performed:

A polyester was selected that had been prepared from equimolar quantities of phthalic and maleic anhydrides and a 10% molal excess of an equivalent amount of propylene glycol, by a conventional esterification heat reaction, under an atmosphere of $CO_2$. The esterification had been continued until the resulting polyester had an acid number of 30–40. Thereafter the unsaturated polyester had been thoroughly mixed with and dissolved in sufficient styrene so that the latter constituted 14.0% of the total weight of the final solution, and there was also included as part of the monomer system 20.0% by weight of the solution of methyl methacrylate. The resin also contained a very small amount of p. tertiary butyl catechol by reason of its presence in the styrene as obtained commercially, and about 0.015 wt. percent of hydroquinone incorporated in the polyester-styrene mixture as inhibitor to increase the storage life of the resin solution as is conventional in the art. The resulting unsaturated polyester resin was then used in four different SPI Gel Time Determinations and pot life tests as follows:

In a first sample designated "C," there was incorporated 0.3% by wt. of a solution of vanadium naphthenate and benzene phosphinic acid in methyl Cellosolve. The solution had the following formulation:

|  | Parts by weight |
|---|---|
| 10% solution of vanadium naphthenate in dioctyl phthalate | 5 |
| Benzene phosphinic acid | 25 |
| Methyl Cellosolve | 100 |

The use of methyl Cellosolve as solvent for the two component promoter system is preferred as it facilitates handling and even incorporation of such system in the polyester-monomer solution.

As catalyst system, there was included in sample "C," 1.0 wt. percent cumene hydroperoxide and 0.25 wt. percent benzoyl peroxide.

In another sample designated "D," there was included the same amount of promoter solution as in "C"; namely, 0.3 wt. percent. However, instead of the 1.0 wt. percent cumene hydroperoxide incorporated into resin solution "C" described above, there was included as total catalyst, 1.0 wt. percent benzoyl peroxide.

In a third sample designated "E," 1.0 wt. percent of benzoyl peroxide only was included as catalyst with no promoter of any kind added.

In a fourth sample designated "Control," as in sample "C" above, 1.0 wt. percent cumene hydroperoxide and 0.25 wt. percent benzoyl peroxide were incorporated as catalyst system, but the promoter system of the invention was excluded.

Then, in accordance with the SPI Gel Time Determination, each of four 19 x 150 mm. test tubes was filled to a depth of 3 inches with a respective one of the designated samples. A thermocouple attached to a recording device was inserted into the center of each of the resin solution masses, respectively. The test tubes so prepared were then placed into a bath maintained at 180° F. The temperatures of the resin solutions were seen to rise beyond the bath temperature to respective peak temperatures, and ultimately the resins were observed to harden. As the foregoing occurred, observations were made and recorded.

Specifically, the time interval that it took for the resin solutions to pass from 150° to 190° F. was recorded, which under the SPI Gel Time Determination is empirically defined and referred to as the "gel time." Also observed and recorded were the time intervals measured from 150° F. that it took for the samples to reach the highest or peak temperatures. This, under the tests, is referred to as "time of exotherm." Finally, the actually highest temperatures reached by the resin solutions were observed and recorded. This is referred to as "peak exotherm." In addition to the foregoing, the room temperature pot life of each polyester resin solution was observed and recorded by introducing 80 gm. samples of each of the four resin solutions into 150 ml. beakers and allowing them to set at room temperatures. The samples were checked frequently and the pot life of each measured as the time that it took for gelation to occur.

The results obtained in the foregoing SPI gel time and pot life tests of the four samples "C," "D," "E," and "Control" are given below in Table I.

TABLE I

| Sample | Gel Time, min.: sec. | Time of Exotherm, min.: sec. | Peak Exotherm, degrees | Pot Life at 78° F. |
|---|---|---|---|---|
| C | 12:20 | 20:20 | 334 | 145 min. |
| D | 5:00 | 6:55 | 388 | Greater than 120 hrs. |
| E | 4:45 | 6:40 | 392 | Do. |
| Control | 9:20 | 12:50 | 376 | Do. |

The foregoing comparisons demonstrate clearly that the inclusion of a tertiary hydroperoxide as major component of the peroxy catalyst system, when promoted by the vanadium compound-benzene phosphinic acid system, in addition to providing the intrinsic advantages of the present invention, compares quite favorably with the use of comparable amounts of the much more expensive benzoyl peroxide as sole catalyst, whether promoted in the same manner or not.

The following typical formulations are given by way of example to illustrate the methods and compositions of this invention. All parts are given by weight.

*Example 1*

An unsaturated polyester resin was prepared in conventional manner from components consisting of 23.7% maleic anhydride, 35.8% phthalic anhydride, and 40.48% propylene glycol, to which was added 0.015% hydroquinone as conventional polyermization inhibitor, by heating a mixture thereof. The heating was carried out under a $CO_2$ atmosphere at a temperature of about 210° C. for 6–8 hours, at which time the acid number had fallen to between 25 and 30. To 85 parts of such polyester resin, there were added 15 parts styrene.

Separately there was prepared a promoter composition having the following formulation:

| | Parts by weight |
|---|---|
| Methyl "Cellosolve" | 100 |
| Benzene phosphinic acid | 25 |
| A 10% solution of vanadium naphthenate in dioctyl phthalate | 5 |

The promoter composition was prepared by charging the methyl Cellosolve into a reaction vessel and heating to 80–100° F. The vanadium naphthenate was then added while the charge was agitated in the reaction vessel and the temperature thereof maintained at 80–100° F. until the vanadium naphthenate was completely dissolved. The benzene phosphinic acid was incorporated into the mixture while the charge was again agitated while the temperature range was maintained at 80–100° F. until all the benzene phosphinic acid was dissolved and was in complete solution. The completed solution was cooled to room temperature and stored in a glass lined container until it was used with a polyester resin.

(a) A formulation employing the invention was prepared from the following components:

| | |
|---|---|
| Polyester resin as described above | 85.0 parts |
| Styrene | 15.0 parts |
| Cumene hydroperoxide | 1.0% of total composition |
| Benzoyl peroxide | 0.25% of total composition |
| Promoter composition comprising methyl Cellosolve, benzene phosphinic acid, and vanadium naphthenate in dioctyl phthalate prepared as described above | 0.25%. |

The above formulation is useful in producing corrugated sheeting comprising glass fibers, and is characterized by a gel time at 150° F. of about 11 to 12 minutes and reaches a peak exotherm in about 17 to 18 minutes. The catalyzed pot life of such composition at 77° F. is approximately 1 hours and 30 minutes, to permit ample time for applying the compositions.

(b) Instead of the polyester resin described above there was substituted a polyester having the following formulation:

| | Wt. Percent | Mol Ratio |
|---|---|---|
| Maleic Anhydride | 17.45 | 0.38 |
| Phthalic Anhydride | 43.0 | 0.62 |
| Propyleneglycol | 39.55 | 1.11 |
| Hydroquinone | 0.0090% | of finished product |
| Dibutyl Phthalate | 0.045% | |
| Styrene | 30% | |

To 100 parts of the above polyester resin there was added 1.0% cumene hydroperoxide, 0.25% benzoyl peroxide, and 0.25% of the same promoter system that comprises methyl "Cellosolve," benzene phosphinic acid, and vanadium naphthenate, as in (a) above. This composition is likewise useful for corrugated sheet manufacture and gives a gel time, a peak exotherm, and a catalyzed pot life substantially equal to that specified for composition (a) above.

Resin products exemplified by compositions (a) and (b), when pigmented, show good color retention upon curing in the presence of the described catalyst-promoter systems of the invention. Moreover, the two-component promoter systems of the invention are not inhibited by pigments that contain inhibiting ions, such as cadmium, as is the case for other promoter systems. In connection with the latter, a usual expedient is to increase the amount of promoter to overcome the inhibitive effect of the pigment used. In addition to increased cost of such promoter systems, the increased amount of promoter tends to discolor the finished product.

An illustration of the advantages obtained in the use of the invention with resin compositions that contain inhibitive pigments is given in the example below:

Example 2

Utilizing the same unsaturated polyester resin described in Example 1, five separate compositions were formulated as given in Table II below:

TABLE II

|  | F Wt. Percent | G Wt. Percent | H Wt. Percent | I Wt. Percent | J Wt. Percent |
|---|---|---|---|---|---|
| Unsaturated Polyester, Resin of Example 1 | 85 | 85 | 85 | 85 | 85 |
| Styrene | 15 | 15 | 15 | 15 | 15 |
| Promoter system comprising vanadium naphthenate and benzene phosphinic acid as described in Example 1 | .25 | .25 | | | .25 |
| Benzoyl Peroxide | .25 | .25 | | .25 | .25 |
| Cumene Hydroperoxide | 1.00 | 1.00 | 1.00 | | |
| Cadmium Yellow | | 2.4 | 2.4 | 2.4 | 2.4 |

Gel time and pot life determinations were then conducted with the results given in Table III below:

TABLE III

|  | F | G | H | I | J |
|---|---|---|---|---|---|
| Gel Time (at 150° F.) | 13 min., 10 sec | 13 min., 20 sec | 120 min | >5 hrs | >5 hrs |
| Gel Temperature, ° F | 142 | 142 | 150 | Did not gel within period tested. | |
| Peak Temperature, ° F | 366 | 395 | 348 | | |
| Time to Peak Temperature | 17 min., 25 sec | 19 min., 28 sec | 145 min | | |
| Room Temperature Pot Life (78° F.) | 1 hr., 20 min | 1 hr., 25 min | >72 hrs | >72 hrs | >72 hrs |

It will be noted from a comparison of the data given in Table III for compositions "F" and "G" that inclusion of a catalyst-promoter system in accordance with the invention results in highly desirable cure characteristics that are substantially unaffected even when a strongly inhibitive pigment, such as one containing cadmium, is included in the polyester compositions. On the other hand Composition "H" that contained an inhibitive pigment and a catalyst system utilized in the invention, but not the promoter system of the invention, exhibited markedly inferior curing characteristics in all categories tested, as is evident from Table III above. Composition "I" containing inhibitive pigment but neither catalyst nor promoter system of the invention, obviously was worthless insofar as rapid gelation and final cure characteristics were concerned. Remarkably, such characteristics were not improved in the least practical manner by inclusion of a promoter system in accordance with the invention, when the tertiary hydroperoxide catalyst of the novel combination was omitted from the peroxy catalyst system containing benzoyl peroxide as exemplified by composition "J."

A promoted and catalyzed unsaturated polyester resin composition was prepared that had the following formulation:

Polyester resin as described in Example 1(a) __ 100.0 parts
Cumene hydroperoxide _____ 1.5% of total product
Benzoyl peroxide _____ 0.25% of total product
Promoter composition as described in Example 1 and comprising methyl "Cellosolve," benzene phosphinic acid and vanadium naphthenate ___ 0.5%

This formulation is illustrative of a promoted and catalyzed unsaturated polyester resin composition particularly suitable for room temperature curing application. The specified formulation was found to have a cure time at room temperature of from 30–45 minutes, so as to be particularly useful in hand lay-up applications, for example.

It is to be understood that the constituents of the polyester compositions in the foregoing examples have been selected as representative of the materials normally found in such compositions, and that the advantages obtained by the invention are unaffected by conventional substitutions or omissions. For instance, similar results are obtained if the styrene is replaced in whole or part by methyl methacrylate or other known cross-linking monomer. Instead of the incorporation of glass fibers in the resin compositions, other fibers such as asbestos fibers and the like may be substituted or obviously omitted altogether if the compositions are to be used in casting applications, for example. Similarly, other filler materials may be included, stabilizer may be omitted if the compositions are to be used immediately, and/or other conventional stabilizers, pigments and other additions may be added or substituted for those disclosed.

Furthermore, the relative proportions of the constituents listed in the examples or the substitutes therefor listed in the foregoing paragraph, as well as hereinbefore, and/or known in the polyester resin art, may be varied within very wide limits. Thus, the unsaturated polyester resin constituents can be varied, and the proportion of monomer polyester resin in the unsaturated polyester combination may likewise vary betwen very wide limits. Moreover, the proportions of stabilizers (when used), promoters, and catalysts can be varied to give the desired combination of shelf life and pot life, as well as gel time and cure time characteristics.

We claim:

1. A method of effecting final cure of unsaturated polyester resins derived from polyhydric alcohol of which at least 95% thereof is dihydric alcohol, and alpha-beta ethylenically unsaturated dicarboxylic acid and having an acid number no higher than about 100, and containing a copolymerizable compound containing at least one $CH_2=C<$ group, which comprises: incorporating therein, as catalyst-promoter system, (1) a promoting amount not above about 0.5% by weight of an organic compound that contains a vanadium atom therein in an oxidation state of less than 5, (2) an effective amount not above about 0.5% by weight of benzene phosphinic acid, and (3) a catalytic amount not above about 3.0% by weight of a tertiary hydroperoxide catalyst.

2. A method of effecting final cure of unsaturated polyester resins derived from polyhydric alcohol of which at least 95% therof is dihydric alcohol, and alpha-beta ethylenically unsaturated dicarboxylic acid and having an acid number no higher than about 100, which comprises: incorporating therein, (A) as copolymerizable system, a compound containing at least one $CH_2=C<$ group and having a boiling point above 60° C., and (B) as catalyst-promoter system, (1) about 0.003% to 0.5% by weight of an organic compound that contains a vanadium atom therein in an oxidation state of less than 5, (2) about 0.03% to 0.5% by weight of benzene phosphinic acid, and (3) about 0.5% to 3.0% by weight of a tertiary hydroperoxide catalyst.

3. A method of effecting final cure as claimed in claim 2, wherein the vanadium atom containing an organic compound is a vanadium salt.

4. A method of effecting final cure as claimed in claim 2, wherein the vanadium atom containing organic compound is vanadium naphthenate.

5. A method of effecting final cure as claimed in claim 2, wherein the tertiary hydroperoxide is cumene hydroperoxide.

6. A polymerizable unsaturated polyester resin composition comprising: (A) an esterification reaction product of (1) polyhydric alcohol of which at least 95% thereof is dihydric alcohol, and (2) dicarboxylic acid that comprises, in an amount that is at least 20 mol percent thereof, alpha-beta ethylenically unsaturated dicarboxylic acid, said esterification reaction product having an acid number no higher than about 100, (B) a copolymerizable substance having at least one $CH_2=C<$ group and having a boiling point of at least 60° C., (C) about 0.003% to 0.5% by weight of an organic solvent-soluble vanadium compound that contains a vanadium atom in an oxidation state of less than 5, and (D) about 0.03% to 0.5% by weight of benzene phosphinic acid.

7. A polymerizable unsaturated polyester resin composition comprising: (A) an esterification reaction product of (1) polyhydric alcohol of which at least 95% thereof is dihydric alcohol, and (2) dicarboxylic acid that comprises, in an amount that is at least 20 mol percent thereof, alpha-beta ethylenically unsaturated dicarboxylic acid, said esterification reaction product having an acid number no higher than about 100, (B) a copolymerizable substance having at least one $CH_2=C<$ group and having a boiling point of at least 60° C., (C) a cadmium pigment, (D) about 0.003% to 0.5% by weight of an organic solvent-soluble vanadium compound that contains a vanadium atom in an oxidation state of less than 5, and (E) about 0.03% to 0.5% by weight of benzene phosphinic acid.

8. A polymerizable unsaturated polyester resin composition comprising: (A) an esterification reaction product of (1) polyhydric alcohol of which at least 95% thereof is dihydric alcohol, and (2) dicarboxylic acid that comprises, in an amount that is at least 20 mol percent thereof alpha-beta ethylenically unsaturated dicarboxlic acid, said esterification reaction product having an acid number no higher than about 100, (B) a copolymerizable substance having at least one $CH_2=C<$ group and having a boiling point of at least 60° C., (C) about 0.003% to 0.5% by weight of an organic solvent-soluble vanadium compound that contains a vanadium atom in an oxidation state of less than 5, (D) about 0.03% to 0.5% by weight of benzene phosphinic acid, and (E) about 0.5% to 3.0% by weight of a tertiary hydroperoxide catalyst.

9. A polymerizable unsaturated polyester resin composition comprising: (A) an esterification reaction product of (1) polyhydric alcohol of which at least 95% thereof is dihydric alcohol, and (2) dicarboxylic acid that comprises, in an amount that is at least 20 mol percent thereof, alpha-beta ethylenically unsaturated dicarboxylic acid, said esterification reaction product having an acid number no higher than about 100, (B) a copolymerizable substance having at least one $CH_2=C<$ group and having a boiling point of at least 60° C., (C) a cadmium pigment, (D) about 0.003% to 0.5% by weight of an organic solvent-soluble vanadium compound that contains a vanadium atom in an oxidation state of less than 5, (E) about 0.03% to 0.5% by weight of benzene phosphinic acid, and (F) about 0.5% to 3.0% by weight of a tertiary hydroperoxide catalyst.

References Cited in the file of this patent

UNITED STATES PATENTS

| | | |
|---|---|---|
| 2,255,313 | Ellis | Sept. 19, 1941 |
| 2,543,635 | Loritsch | Feb. 27, 1951 |
| 2,584,773 | Reynolds et al. | Feb. 5, 1952 |
| 2,607,705 | Kumins | Aug. 19, 1952 |
| 2,642,410 | Hoppens | June 16, 1953 |
| 2,683,140 | Howard | July 6, 1954 |